(12) United States Patent
Fukuda (10) Patent No.: US 8,521,935 B2
(45) Date of Patent: Aug. 27, 2013

(54) PORTABLE ELECTRONIC APPARATUS, CONTROL METHOD FOR PORTABLE ELECTRONIC APPARATUS, AND IC CARD

(75) Inventor: Aki Fukuda, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 356 days.

(21) Appl. No.: 12/875,838

(22) Filed: Sep. 3, 2010

(65) Prior Publication Data

US 2011/0066257 A1  Mar. 17, 2011

(30) Foreign Application Priority Data

Sep. 17, 2009  (JP) .................................. 2009-216061

(51) Int. Cl.
*G06F 13/24* (2006.01)

(52) U.S. Cl.
USPC ........................................................ 710/260

(58) Field of Classification Search
USPC ........................................................ 710/260
See application file for complete search history.

(56) References Cited

U.S. PATENT DOCUMENTS

| | | | | |
|---|---|---|---|---|
| 5,129,091 A | * | 7/1992 | Yorimoto et al. | 713/323 |
| 5,410,714 A | | 4/1995 | Yorimoto et al. | |
| 5,615,381 A | * | 3/1997 | Iijima | 710/260 |
| 5,754,762 A | * | 5/1998 | Kuo et al. | 726/23 |
| 2005/0077356 A1 | * | 4/2005 | Takayama et al. | 235/451 |
| 2006/0027644 A1 | | 2/2006 | Takashi et al. | |
| 2006/0261927 A1 | | 11/2006 | Kelly et al. | |
| 2009/0199206 A1 | | 8/2009 | Finkenzeller et al. | |

FOREIGN PATENT DOCUMENTS

| | | |
|---|---|---|
| EP | 1 431 904 A2 | 6/2004 |
| JP | 2006-268525 | 10/2006 |
| WO | WO 02/099741 | 12/2002 |

OTHER PUBLICATIONS

International. Standard, ISO/IEC 14443-4, First Ed., Feb. 1, 2001.
Singapore Search Report dated Mar. 17, 2011 for Singapore Appln. No. 201006453-3.
European Search Report dated Feb. 10, 2011.
IEEE, "Identification cards—Contactless integrated circuit(s) cards—Proximity cards—Part 4: Transmission protocol"; Piscataway, NJ, USA; Jul. 13, 2000; XP 040389513; pp. 21-24; 31, 34, 38.

* cited by examiner

*Primary Examiner* — Nimesh G Patel
(74) *Attorney, Agent, or Firm* — Pillsbury Winthrop Shaw Pittman, LLP (57) ABSTRACT

According to one embodiment, a portable electronic apparatus includes a receiving section configured to receive from an external device an instruction for a transition from an active state to a state in which processing is temporarily interrupted, a recognition section configured to recognize a processing method in a state established in the active state based on processing specification information contained in the instruction, and a controller configured to maintain the state established in the active state even in the state for the temporary interruption or restore an initial state before the establishment.

6 Claims, 5 Drawing Sheets

F I G. 1

F I G. 2

| Prologue field | | | Information field | Epilogue field |
|---|---|---|---|---|
| PCB | [CID] | [NAD] | [INF] | EDC |
| 1 byte | 1 byte | 1 byte | | 2 bytes |

FIG. 3

| 1 | 1 | 0 | 0 | CID | 0 | RFU 1 | RFU 2 |
|---|---|---|---|---|---|---|---|

FIG. 4

| Contents | RFU1 | RFU2 |
|---|---|---|
| Maintain application and OS states | 0 | 0 |
| Restore application to initial state | 0 | 1 |
| Restore OS to initial state | 1 | 0 |
| Restore application and OS to initial states | 1 | 1 |

PORTABLE ELECTRONIC APPARATUS, CONTROL METHOD FOR PORTABLE ELECTRONIC APPARATUS, AND IC CARD

CROSS-REFERENCE TO RELATED APPLICATIONS

This application is based upon and claims the benefit of priority from Japanese Patent Application No. 2009-216061, filed Sep. 17, 2009; the entire contents of which are incorporated herein by reference.

FIELD

Embodiments described herein relate generally to a portable electronic apparatus configured to achieve various kinds of processing by, for example, transmitting and receiving commands.

BACKGROUND

In general, an IC card for use as a portable electronic apparatus is provided with a card-shaped main body of plastic or the like and an IC module embedded therein. The IC module comprises an IC chip. The IC chip comprises a nonvolatile memory, such as an electrically erasable programmable read-only memory (EEPROM) or flash ROM, which can hold data without power supply, and a CPU configured to perform various operations.

IC cards are highly portable and can perform communication with external equipment and complicated arithmetic processing. Since they are hard to forge, moreover, the IC cards are assumed to be loaded with highly confidential information or the like and used for a security system, electronic business transaction, etc.

In recent years, non-contact IC cards capable of data transmission and reception by non-contact communication have become widely used. One such non-contact IC card comprises an IC chip and antenna. This IC card receives a magnetic field generated from a card reader/writer of a terminal device that processes the IC card and is activated as the antenna therein is excited by electromagnetic induction.

According to its protocol specifications, the non-contact IC card transitions to a standby state in which a wake-up command (WUPA or WUPB) is awaited in response to an instruction (DESELECT) for a transition to a state in which processing is interrupted after the card is activated to perform an operation. The transition to this standby state is an operation of a protocol layer.

There are various cases where processing is interrupted so that the non-contact IC card is shifted to an inactive state by a DESELECT command. In one such case, the interruption is temporary and processing having hitherto been performed is continued at the restart. In another case, previous processing is reset and new processing is started from an initial state. These cases are selected depending on the state to which a transition is to be made from the OS or application state. Since the processing for the transition to the inactive state by the DESELECT command is the operation of the protocol layer, however, no operations are provided corresponding to the above-described various cases.

DETAILED DESCRIPTION

In general, according to one embodiment, a portable electronic apparatus comprising: a receiving section configured to receive from an external device an instruction for a transition from an active state to a state in which processing is temporarily interrupted; a recognition section configured to recognize a processing method in a state established in the active state based on processing specification information contained in the instruction; and a controller configured to maintain the state established in the active state even in the state for the temporary interruption or restore an initial state before the establishment.

[First Embodiment]

A portable electronic apparatus according to a first embodiment of the present invention will now be described in detail with reference to the accompanying drawings.

Figure 1:
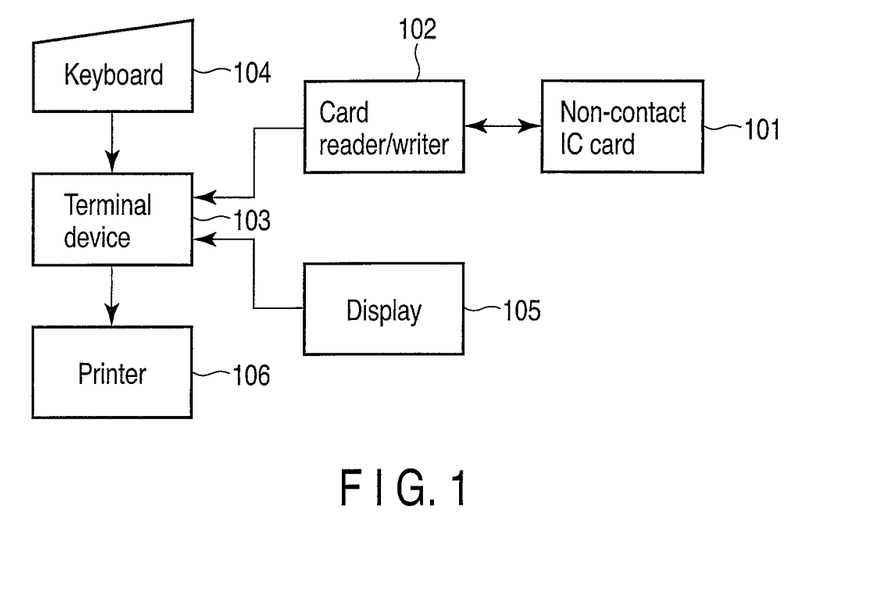
FIG. 1 is a diagram showing an exemplary configuration of an IC card system that handles a non-contact IC card for use as a portable electronic apparatus according to an embodiment.

FIG. 1 is a diagram showing an exemplary configuration of an IC card system that handles a non-contact IC card for use as a portable electronic apparatus according to an embodiment.

The IC card system comprises a non-contact IC card 101, card reader/writer 102, terminal device 103, keyboard 104, display 105, and printer 106.

The terminal device 103 connects with the card reader/writer 102, keyboard 104, display 105, and printer 106. The IC card 101 is connected to the terminal device 103 through the card reader/writer 102 as an external device.

The non-contact IC card 101 transitions to an operable state when it is supplied with energy from the card reader/writer 102. Various kinds of processing are performed in response to request commands transmitted from the card reader/writer 102.

The terminal device 103 comprises a personal computer or the like. The terminal device 103 performs the various kinds of processing by executing various control programs stored in its built-in memory. Data are transferred to and from the non-contact IC card 101 via the card reader/writer 102.

Figure 2:
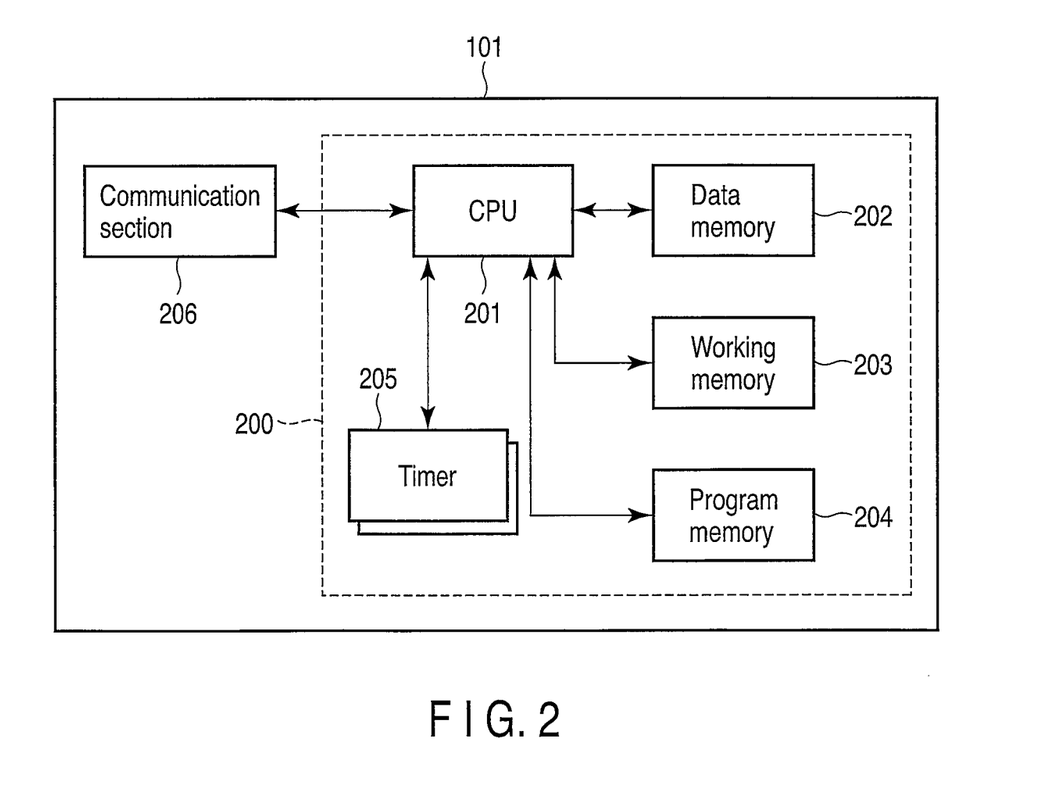
FIG. 2 is a diagram showing an exemplary configuration of the non-contact IC card according to the embodiment.

FIG. 2 is a diagram showing an exemplary configuration of the non-contact IC card according to the embodiment.

The non-contact IC card 101 comprises a CPU 201, data memory 202, working memory 203, program memory 204, timers 205, and communication section 206.

A section (including the CPU 201, data memory 202, working memory 203, program memory 204, and timers 205) enclosed by broken line in FIG. 2 comprises a single IC chip 200 (or a plurality of such chips). The IC chip 200 and communication section 206 are connected and integrated into an IC module, which is embedded in the main body of the non-contact IC card.

The CPU 201 is a controller that performs various data processing operations, such as various decision and determination processing operations, memory writing and reading, etc.

The data memory 202 is a rewritable nonvolatile memory, such as an EEPROM, which stores various data including application data in a file structure.

The working memory 203 is a volatile memory, such as a random access memory (RAM), which temporarily holds processing data processed by the CPU 201.

The program memory 204 is a non-rewritable fixed memory, such as a mask read-only memory (ROM), which is stored with control programs of the CPU 201.

The timers 205 count fixed time periods. These timers are correlated with logical channels and are at least as many as the logical channels.

The communication section 206 is an antenna unit, which receives a modulated wave from the card reader/writer 102 in a non-contact manner or originates a modulated wave to the outside. Further, the communication section 206 produces energy or clocks to be supplied to an internal circuit from the received modulated wave.

The following is a description of the operation of the non-contact IC card 101 of the present embodiment.

As mentioned before, the card reader/writer 102 generates a magnetic field to excite the non-contact IC card 101 within a communication range by electromagnetic induction. If a plurality of IC cards exist within the communication range, a "collision" may occur such that the terminal device 103 cannot correctly identify the IC cards in an initial response. In order to prevent this collision and to ensure correct identification of the IC cards, the terminal device 103 and non-contact IC card 101 cooperate with each other to perform anti-collision processing.

After the anti-collision processing is finished, the non-contact IC card 101 transitions to an active state and transmits or receives commands prescribed by ISO/IEC 7816.

If the terminal device 103 temporarily interrupts communication with the active non-contact IC card 101 in order to start communication with another non-contact IC card 101, a DESELECT command is transmitted from the card reader/writer 102 to the active IC card 101. Thereupon, the IC card 101 concerned transitions from the active state to an inactive state in which the processing is temporarily interrupted.

The DESELECT command is prescribed by the following ISO/IEC 14443 Supervisory Block.

Figure 3:
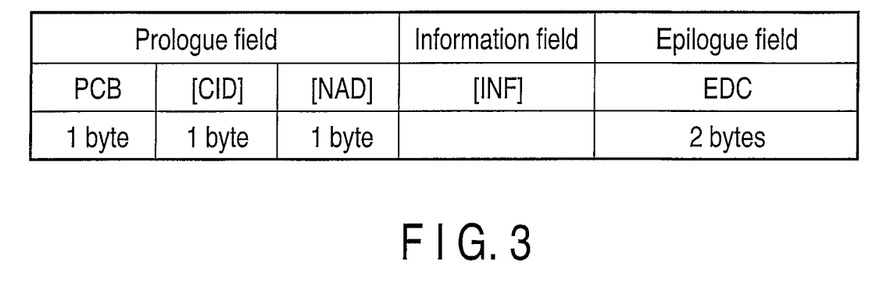
FIG. 3 is a diagram showing an exemplary configuration of a block prescribed by a transfer protocol for non-contact communication according to the embodiment.

FIG. 3 is a diagram showing an exemplary configuration of a block prescribed by a transfer protocol for non-contact communication according to the embodiment. The block comprises a prologue field, information field, and epilogue field. A protocol control byte (PCB) is essential data used to select necessary information for the control of data transfer. The information field is not used as an instruction for inactivation (DESELECT).

Figure 4:
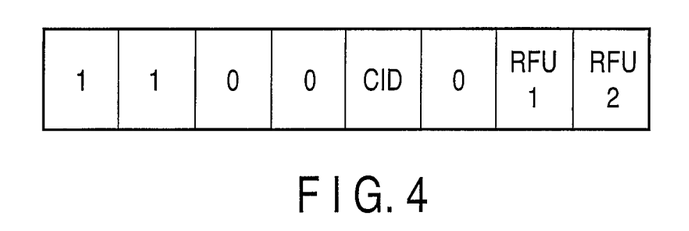
FIG. 4 is a diagram showing an exemplary configuration of a PCB according to the embodiment.

FIG. 4 is a diagram showing an exemplary configuration of the PCB according to the embodiment.

Two leftmost bits "11" indicate that the data concerned is information used for communication between the card reader/writer 102 and non-contact IC card 101. Next two bits "00" are indicative of the DESELECT command.

If the fifth bit as counted from the leftmost one is "1", then it indicates that a card identifier (CID) exists in the prologue field. Two rightmost bits in FIG. 4 are RFU bits reserved for future use.

If the processing is temporarily interrupted by the DESELECT command, according to the present embodiment, two bits RFU1 and RFU2 are used to specify whether to maintain a state established in the active state or to restore an initial state before the establishment.

Figure 5:
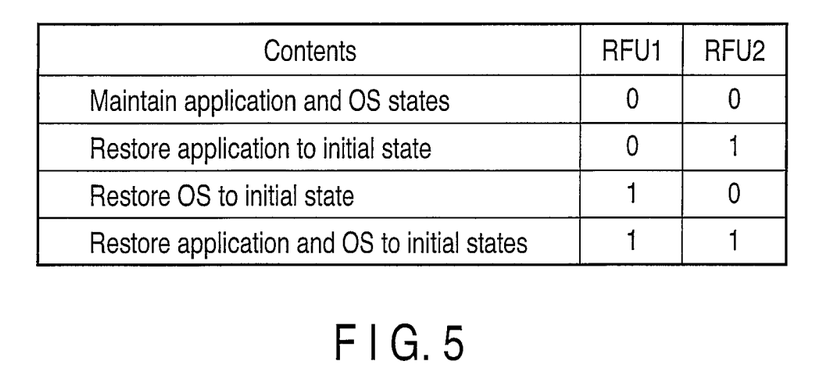
FIG. 5 is a diagram showing an exemplary combination of RFU1 and RFU2 and exemplary processing contents according to the embodiment.

FIG. 5 is a diagram showing an exemplary combination of RFU1 and RFU2 and exemplary processing contents according to the embodiment.

If RFU1 is 1, the operating system (OS) is restored to its initial state. If RFU1 is 0, the current OS state is maintained. If RFU2 is 1, the application is restored to its initial state. If RFU2 is 0, the current application state is maintained. The OS and application states will be described later.

Figure 6:
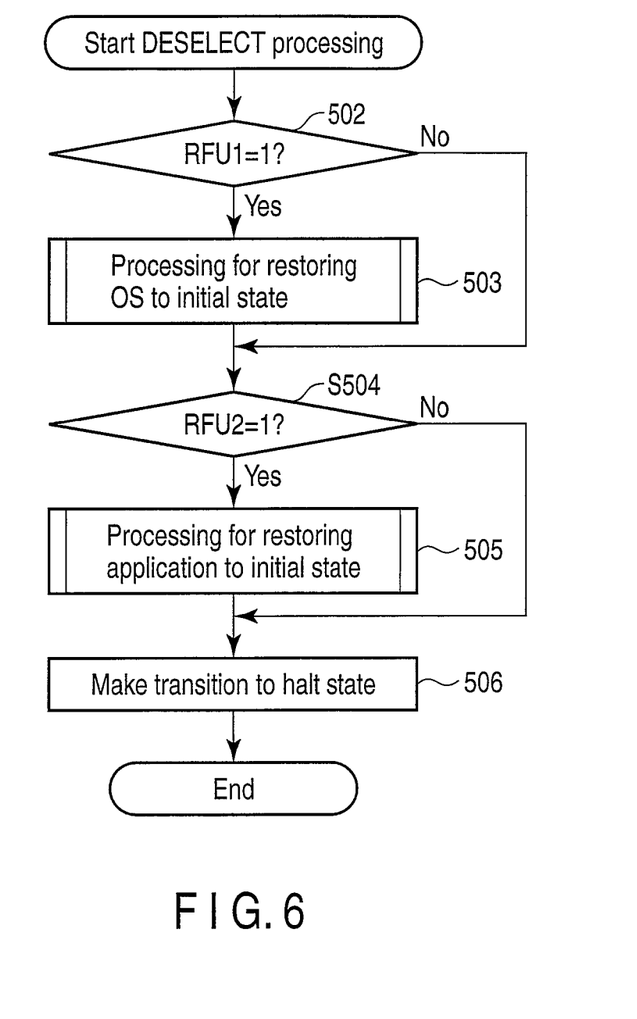
FIG. 6 is an exemplary flowchart showing the operation of the non-contact IC card performed when a DESELECT command is received according to the embodiment.

FIG. 6 is an exemplary flowchart showing the operation of the non-contact IC card 101 performed when the DESELECT command is received according to the embodiment.

In Step 502, RFU1 of the PCB is checked to see if it is 1. If the decision in Step 502 is YES, that is, if RFU1 is 1, processing is performed to restore the OS to the initial state. Information indicative of the OS state to be processed includes, for example, the following items.

"Matching state information" indicates a flag state in which the non-contact IC card 101 is key-matched.

"Current EF information" is information as to whether or not an elementary file (EF) is selected by a SELECT command.

"Current DF information" is information as to whether or not a dedicated file (DF) is selected by the SELECT command.

"Current record information" is information on a current record.

"Logical channel information" is information on a currently open logical channel.

All these OS conditions are saved in the working memory 203.

After Step 503 is performed or if the decision in Step 502 is NO, that is, if RFU1 is 0, RFU2 is checked in Step 504 to see if it is 1.

If the decision in Step 504 is YES, that is, if RFU2 is 1, processing is performed in Step 505 to restore the application to the initial state. Information indicative of the application state to be processed includes, for example, the following items.

"State transition management information" is information on the progress of a series of processing flows.

"Authentication/matching state management information" is information indicative of authentication and matching states managed within the application and used besides the OS to manage the authentication and matching states.

"Session key information" is information on different keys that are generated by the application based on random numbers on each occasion.

"Secret information" is information that is not output from the card managed within the application.

All these application conditions are saved in the working memory 203.

After Step 505 is performed or if the decision in Step 504 is NO, that is, if RFU2 is 0, a transition is made to a halt state in Step 506. This state is maintained until a wake-up command is issued anew.

[Second Embodiment]

A second embodiment differs from the first embodiment in that the OS or application state to which a transition is to be made can be specified on each occasion. Therefore, like numbers are used to designate like portions of the first and second embodiments and a detailed description thereof is omitted.

Figure 7:
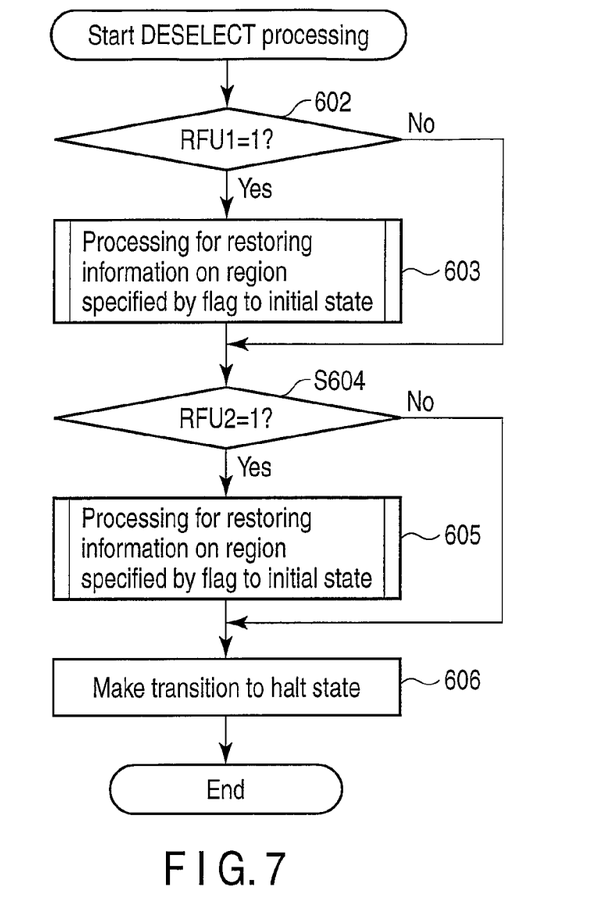
FIG. 7 is an exemplary flowchart showing the operation of a non-contact IC card of a second embodiment performed when a DESELECT command is received.

FIG. 7 is an exemplary flowchart showing the operation of a non-contact IC card 101 of the second embodiment performed when a DESELECT command is received.

In Step 602, RFU1 of a PCB is checked to see if it is 1. If the decision in Step 602 is YES, that is, if RFU1 is 1, information on a region specified by a flag is restored to its initial state in Step 603.

For example, if each bit of flag is 1, information indicative of each corresponding OS state is restored to its initial state. If each bit is 0, the information indicative of each corresponding OS state is maintained.

Figure 8:
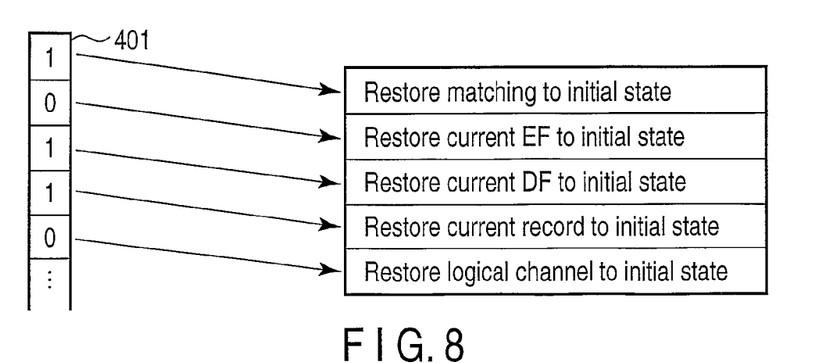
FIG. 8 is an exemplary diagram showing the correspondence between a flag and a region stored with information on the OS state according to the embodiment.

FIG. 8 is an exemplary diagram showing the correspondence between a flag 401 and a region stored with information on the OS state according to the embodiment.

Since flag 401 is set to "10110" in FIG. 8, "matching state information", "current DF information", and "current record information" are restored to their initial states, while "current EF information" and "logical channel information" are maintained as they are.

After Step 603 is performed or if the decision in Step 602 is NO, that is, if RFU1 is 0, RFU2 is checked in Step 604 to see if it is 1.

If the decision in Step 604 is YES, that is, if RFU2 is 1, processing is performed in Step 605 to restore the application specified by a flag to its initial state.

For example, if each bit of flag is 1, information indicative of each corresponding application state is restored to its initial state. If each bit is 0, the information indicative of each corresponding application state is maintained.

Figure 9:
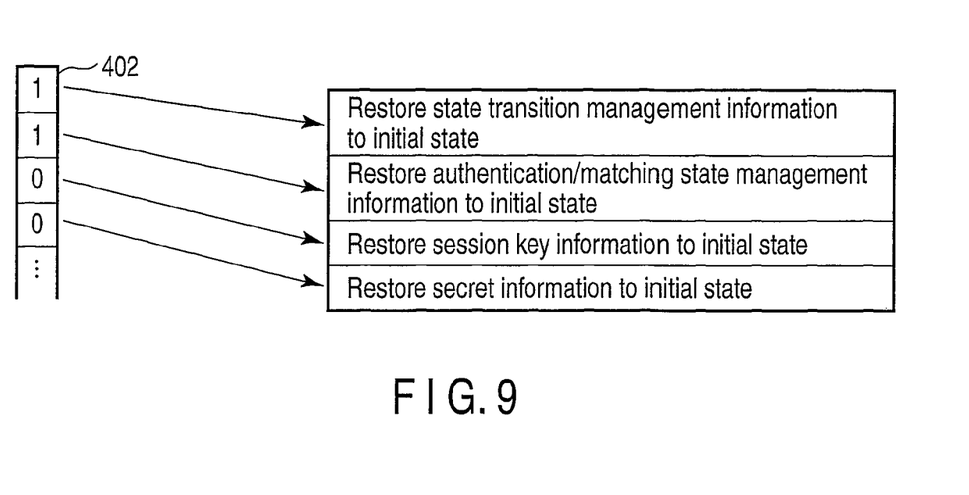
FIG. 9 is an exemplary diagram showing the correspondence between a flag and a region stored with information on the application state according to the embodiment.

FIG. 9 is an exemplary diagram showing the correspondence between a flag 402 and a region stored with information on the application state according to the embodiment.

Since flag 402 is set to "1100" in FIG. 9, "state transition management information" and "authentication/matching state management information" are restored to their initial states, while "session key information" and "secret information" are maintained as they are.

After Step 605 is performed or if the decision in Step 604 is NO, that is, if RFU2 is 0, a transition is made to a halt state in Step 606. This state is maintained until a wake-up command is issued anew.

Flags 401 and 402 are set when the non-contact IC card 101 is issued. After the issue, flags 401 and 402 may be made either rewritable or non-rewritable.

[Third Embodiment]

A third embodiment differs from the second embodiment in that the OS or application state to which a transition is to be made can be specified on each occasion not by a PCB but by flags. Therefore, like numbers are used to designate like portions of the second and third embodiments and a detailed description thereof is omitted.

Figure 10:
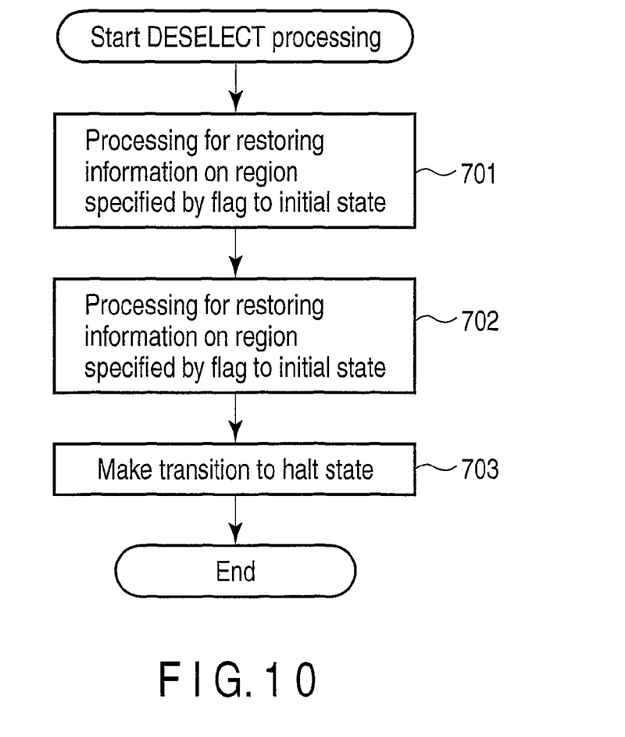
FIG. 10 is an exemplary flowchart showing the operation of a non-contact IC card of a third embodiment performed when a DESELECT command is received.

FIG. 10 is an exemplary flowchart showing the operation of a non-contact IC card 101 of the third embodiment performed when a DESELECT command is received.

In Step 701, the non-contact IC card 101 restores information on a region specified by the flag. Since this operation resembles the one described with reference to FIG. 8, a repeated description thereof is omitted.

In Step 702, the non-contact IC card 101 restores information on the region specified by the flag. Since this operation resembles the one described with reference to FIG. 9, a repeated description thereof is omitted.

A transition is made to a halt state in Step 703, and this state is maintained until a wake-up command is issued anew.

Flags 401 and 402 are set when the non-contact IC card 101 is issued. After the issue, flags 401 and 402 may be made either rewritable or non-rewritable.

The functions explained in connection with the embodiments described herein are not limited to configurations based on hardware, and they can be realized by loading a computer with programs that contain them by means of software. Further, each function may be appropriately constructed by selecting either software or hardware.

The present invention is not limited directly to the embodiments described herein, and in carrying out the invention, its constituent elements may be embodied in various forms without departing from the spirit of the invention.

While certain embodiments have been described, these embodiments have been presented by way of example only, and are not intended to limit the scope of the inventions. Indeed, the novel embodiments described herein may be embodied in a variety of other form; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An IC card comprising:
   a receiving section configured to receive from an external device an instruction for a transition from an active state to a state in which processing is temporarily interrupted;
   a recognition section configured to recognize a processing method in a state of each of an OS and an application, which is established in the active state for each of a plurality of objects based on processing specification information contained in the instruction;
   a storage section stored with individual information configured to determine whether to maintain the state established in the active state for each of individual objects as subdivisions a state of each of the OS and the application even in the state for the temporary interruption or to restore the state to an initial state before the establishment; and
   a controller which performs processing, determined for the individual objects by the individual information, with respect to the state of said each of the OS and the application for which the processing specification information specifies the restoration of the state established in the active state to the initial state before the establishment,
   wherein each of the individual objects of the OS includes at least one of a flag state indicating that the IC card is key-matched, information regarding whether or not an elementary file (EF) or a dedicated file (DF) is selected in response to a command, information on a current record, and information on a currently open logical channel, and
   wherein each of the individual objects of the application includes at least one of information on the progress of a series of processing flows, information indicative of authentication and matching states managed within the application, information on keys generated based on random numbers, and information which is not output from the IC card and managed within the application.

2. An IC card comprising:

a receiving section configured to receive from an external device an instruction for a transition from an active state to a state in which processing is temporarily interrupted;

a storage section stored with individual information which determines whether to maintain the state of each of an OS and an application, which is established in the active state for each of a plurality of objects to be processed even in the state for the temporary interruption or to restore the state to an initial state before the establishment; and a controller configured to perform processing determined for the individual objects by the individual information with respect to the state of said each of the OS and the application, wherein each of the individual objects of the OS includes at least one of a flag state indicating that the IC card is key-matched, information regarding whether or not an elementary file (EF) or a dedicated file (DF) is selected in response to a command, and information on a current record, and information on a currently open logical channel, and wherein each of the individual objects of the application includes at least one of information on the progress of a series of processing flows, information indicative of authentication and matching states managed within the application, information on keys generated based on random numbers, and information which is not output from the IC card and managed within the application.

3. A control method for an IC card, comprising:

receiving from an external device an instruction for a transition from an active state to a state in which processing is temporarily interrupted;

recognizing a processing method in a state of each of an OS and an application, which is established in the active state for each of a plurality of objects based on processing specification information contained in the instruction;

storing individual information which determines whether to maintain the state of each of an OS and an application, which is established in the active state for each of individual objects as subdivisions of the objects even in the state for the temporary interruption or to restore an initial state before the establishment; and performing processing, determined for the individual objects by the individual information, with respect to the state of said each of the OS and the application for which the processing specification information specifies the restoration of the state established in the active state to the initial state before the establishment, wherein each of the individual objects of the OS includes at least one of a flag state indicating that the IC card is key-matched, information regarding whether or not an elementary file (EF) or a dedicated file (DF) is selected in response to a command, and information on a current record, and information on a currently open logical channel, and wherein each of the individual objects of the application includes at least one of information on the progress of a series of processing flows, information indicative of authentication and matching states managed within the application, information on keys generated based on random numbers, and information which is not output from the IC card and managed within the application.

4. A control method for an IC card, comprising:

receiving from an external device an instruction for a transition from an active state to a state in which processing is temporarily interrupted;

storing individual information which determines whether to maintain the state of each of an OS and an application, which is established in the active state for each of a plurality of objects to be processed even in the state for the temporary interruption or to restore the state to an initial state before the establishment; and performing processing determined for the individual objects by the individual information with respect to the state of said each of the OS and the application, wherein each of the individual objects of the OS includes at least one of a flag state indicating that the IC card is key-matched, information regarding whether or not an elementary file (EF) or a dedicated file (DF) is selected in response to a command, and information on a current record, and information on a currently open logical channel, and wherein each of the individual objects of the application includes at least one of information on the progress of a series of processing flows, information indicative of authentication and matching states managed within the application, information on keys generated based on random numbers, and information which is not output from the IC card and managed within the application.

5. An IC card comprising:

an IC module comprising a receiving section configured to receive from an external device an instruction for a transition from an active state to a state in which processing is temporarily interrupted, a recognition section configured to recognize a processing method in a state of each of an OS and an application, which is established in the active state for each of a plurality of objects based on processing specification information contained in the instruction, a storage section stored with individual information which determines whether to maintain the state established in the active state for each of individual objects as subdivisions of said each of the OS and the application even in the state for the temporary interruption or to restore the state to an initial state before the establishment, and a controller configured to perform processing, determined for the individual objects by the individual information, with respect to the state of said each of the OS and the application for which the processing specification information specifies the restoration of the state established in the active state to the initial state before the establishment; and an IC card main body which contains the IC module, wherein each of the individual objects of the OS includes at least one of a flag state indicating that the IC card is key-matched, information regarding whether or not an elementary file (EF) or a dedicated file (DF) is selected in response to a command, and information on a current record, and information on a currently open logical channel, and wherein each of the individual objects of the application includes at least one of information on the progress of a series of processing flows, information indicative of authentication and matching states managed within the application, information on keys generated based on random numbers, and information which is not output from the IC card and managed within the application.

6. An IC card comprising:

an IC module comprising a receiving section configured to receive from an external device an instruction for a transition from an active state to a state in which processing is temporarily interrupted, a storage section stored with individual information which determines whether to maintain the state of each of an OS and an application, which is established in the active state for each of a plurality of objects to be processed even in the state for the temporary interruption or to restore the state to an initial state before the establishment, and a controller configured to perform processing determined for the individual objects by the individual information with respect to the state of said each of the OS and the application; and an IC card main body which contains the IC module, wherein each of the individual objects of the OS includes at least one of a flag state indicating that the IC card is key-matched, information regarding whether or not an elementary file (EF) or a dedicated file (DF) is selected in response to a command, and information on a current record, and information on a currently open logical channel, and wherein each of the individual objects of the application includes at least one of information on the progress of a series of processing flows, information indicative of authentication and matching states managed within the application, information on keys generated based on random numbers, and information which is not output from the IC card and managed within the application.

\* \* \* \* \*